US012640109B2

(12) United States Patent
    Dancona

(10) Patent No.: US 12,640,109 B2
(45) Date of Patent: May 26, 2026

(54) REFRIGERATOR EASY TO MAINTAIN AND PROVIDED WITH TRANSPARENT LCD SCREEN, AND CONTROL METHOD

(71) Applicant: COOLER AI, Toronto (CA)

(72) Inventor: Abraham Dancona, Toronto (CA)

(73) Assignee: COOLER AI, Toronto (CA)

( * ) Notice: Subject to any disclaimer, the term of this patent is extended or adjusted under 35 U.S.C. 154(b) by 57 days.

(21) Appl. No.: 18/423,586

(22) Filed: Jan. 26, 2024

(65) Prior Publication Data

US 2025/0239233 A1     Jul. 24, 2025

(30) Foreign Application Priority Data

Jan. 18, 2024     (CN) .......................... 202410076081.7

(51) Int. Cl.
| | |
|---|---|
| *G09G 3/36* | (2006.01) |
| *F25D 29/00* | (2006.01) |
| *G06F 3/01* | (2006.01) |
| *G06F 3/147* | (2006.01) |
| *G06V 40/16* | (2022.01) |
| *H04N 23/57* | (2023.01) |

(52) U.S. Cl.
CPC ............. *G09G 3/36* (2013.01); *F25D 29/005* (2013.01); *G06F 3/011* (2013.01); *G06F 3/147* (2013.01); *G06V 40/166* (2022.01); *G06V 40/172* (2022.01); *H04N 23/57* (2023.01); *G09G 2300/023* (2013.01); *G09G 2354/00* (2013.01); *G09G 2370/02* (2013.01); *G09G 2370/20* (2013.01)

(58) Field of Classification Search
CPC ............... G09G 3/36; G09G 2300/023; G09G 2354/00; G09G 2370/02; G09G 2370/20; G06V 40/172; G06V 40/166; H04N 23/57; F25D 29/005; G06F 3/011; G06F 3/147
See application file for complete search history.

(56) References Cited

U.S. PATENT DOCUMENTS 10,285,513 B2 *   5/2019  Lee ......................... F25D 27/00

* cited by examiner

*Primary Examiner* — David Y Chung
(74) *Attorney, Agent, or Firm* — JEEN IP LAW, LLC

(57) ABSTRACT

Disclosed is a refrigerator easy to maintain and provided with a transparent LCD screen. A door comprises an inner door assembly, an outer door assembly, a transparent LCD screen module and a control assembly. The inner door assembly comprises a first frame, a first glass panel and a second glass panel. The outer door assembly comprises a second frame and a third glass panel. The transparent LCD screen module and the control assembly are mounted on the second frame, the outer door assembly covers an outer surface and side edges of the door and can be entirely detached from the door body, together with the transparent LCD screen module and the control assembly. When a user is approaching the refrigerator, the transparent LCD screen can play content information A, and when no user is approaching the refrigerator, the transparent LCD screen can play advertisement content information as an advertising screen.

8 Claims, 10 Drawing Sheets

REFRIGERATOR EASY TO MAINTAIN AND PROVIDED WITH TRANSPARENT LCD SCREEN, AND CONTROL METHOD

CROSS-REFERENCE TO RELATED APPLICATIONS

This application claims priority to Chinese Patent Application No. 202410076081.7, filed on Jan. 18, 2024, which is hereby incorporated by reference in its entirety.

TECHNICAL FIELD

The invention relates to the technical field of refrigerators, and more specifically relates particularly relates to a refrigerator easy to maintain and provided with a transparent LCD screen, and a control method and device.

BACKGROUND

It is a hot creative idea emerging internationally in recent years to apply transparent liquid crystal display (LCD) screens to household appliances such as refrigerators to form novel Household/Commercial appliances and display devices. Users can observe products in refrigerators without being hindered by the transparent LCD screens, and the LCD screens can provide a detailed introduction of products in the refrigerators, that is, the transparent LCD screens not only can display pictures, texts and animations, but also allow users to seen commodities exhibited behind the screens.

In addition, the transparent LCD screens can play advertisements of products in refrigerators or other advertising content, etc., thus eliminating the traditional means of adding advertising lamp boxes or LCD advertising screens at the top of the refrigerators.

The transparent LCD screen is mounted in a door of the Refrigerator/cooler/chiller, and when the glass door exchanges heat with the outside air after absorbing cold in the refrigerator, "water mist" often appears on the glass door, hindering users from observing products in the refrigerator. How to avoid the influence of "water mist" on the transparent LCD screen mounted in the door of the refrigerator is a problem to be solved by the present application. In addition, when traditional refrigerators with transparent LCD screens are maintained, the entire refrigerator door has to be detached, making maintenance difficult.

Therefore, the present application provides a refrigerator easy to maintain and provided with a transparent LCD screen, and a control method and device.

SUMMARY

In view of this, the invention provides a refrigerator easy to maintain and provided with a transparent LCD screen, and a control method and device.

To fulfill the above objective, in a first aspect, the invention provides a refrigerator easy to maintain and provided with a transparent LCD screen, comprising a main body and a door mounted on the main body, wherein the door comprises an inner door assembly, an outer door assembly, a transparent LCD screen module and a control assembly.

the inner door assembly comprises a first frame, and a first glass panel and a second glass panel which are mounted on the first frame, and a first gap is formed between the first glass panel and the second glass panel.

the outer door assembly comprises a second frame and a third glass panel mounted on the second frame;

the transparent LCD screen module and the control assembly are limited in a cavity formed between the inner door assembly and the outer door assembly;

the transparent LCD screen module and the control assembly are mounted on the second frame, the outer door assembly covers an outer surface and side edges of the door and is entirely detachable from the door body, together with the transparent LCD screen module and the control assembly;

the transparent LCD screen module comprises an LCD screen and a Nano light guide plate, the LCD screen is located on a front side of the light guide plate, the second glass panel is located on a back side of the light guide plate, and a second gap is formed between the light guide plate and the second glass panel;

a silicone sealing assembly is arranged between the transparent LCD screen a silicone sealing assembly is arranged between the transparent LCD screen module and the second glass panel and pressed between the first frame and the second frame to seal the second gap.

As a preferred solution of the invention, a first groove is formed in an inner side of the first frame, and the first glass panel and the second glass panel are inlaid and mounted in the first groove; the transparent LCD screen module is mounted on the second frame; a position for mounting the transparent LCD screen module is defined on a back side of the second frame by means of a bracket, and the silicone sealing assembly is pressed against the first frame by means of the bracket.

As a preferred solution of the invention, the first frame is rectangular, a first mounting region is formed in the middle of the first frame, the first glass panel and the second glass panel are mounted in the first mounting region, and the area of the first glass panel and the area of the second glass panel are greater than the area of the transparent LCD screen module;

the silicone sealing assembly comprises a sealing strip and a sealing strip holder, a second groove is formed in an inner side of the sealing strip holder, and the sealing strip is inlaid and mounted in the second groove and extends towards the center of the second frame.

As a preferred solution of the invention, the second frame has a second mounting region, the third glass panel is mounted in the second mounting region, the second mounting region corresponds to the transparent LCD screen module, and contents displayed by the transparent LCD screen module are observed through the third glass panel.

As a preferred solution of the invention, the second frame and the first frame are connected through screws, and the third glass panel is fixedly mounted on the second frame.

As a preferred solution of the invention, the control assembly comprises a support plate, an LCD screen logic panel, a screen driver board, a power board and a mini pc; the LCD screen logic panel, the screen driver board, the power board and the mini pc are all mounted on the support plate; a protective cover with vent holes is arranged corresponding to the LCD screen logic panel, the screen driver board, the power board and the mini pc;

the second frame is provided with an opening, a surface cover is arranged corresponding to the opening, the control assembly is mounted in the cavity formed between the inner door assembly and the outer door assembly and exactly faces the opening, and the surface cover covers the control assembly;

the control assembly is provided with at least one type of wire port, and the wire port is uncovered after the surface cover is detached.

As a preferred solution of the invention, the control assembly is located below the transparent LCD screen module and corresponds to a surface of the second glass panel, the support plate is fixedly mounted on the second frame, and the surface cover is mounted on the second frame.

As a preferred solution of the invention, the refrigerator which is easy to maintain and provided with a transparent LCD screen further comprises a camera assembly and distance sensors, and the camera assembly, the transparent LCD screen module and the distance sensors are all electrically connected to the control assembly;

the camera assembly is mounted at a high position on the door, and the distance sensors are mounted on a front side of the door and symmetrically distributed left and right.

In a second aspect, the invention discloses a control method for a transparent LCD screen of a refrigerator, comprising:

a step of starting a player program and determining content information to be played; and A step of interactive content playback using preset by player program through a transparent LCD screen module, based on the proximity of a user when he/she approaching a door.

Further, according to the control method, a step of starting a player program and determining content information to be played, in a case where the player program is started on a device for the first time, the player program searches for content information stored in a local profile and determines, according to searched content information, whether the device has been registered; if the device has been registered and has all required content information, the player program plays the content information normally; otherwise, the device is registered and activated first, and then all required content information is downloaded from a server and stored in the local profile.

Further, according to the control method, the content information includes: storage device ID applied to the local profile, a registration and activation code, an activation date, content information A, content information B, camera assembly configuration information and distance sensor configuration information.

Further, according to the control method, in a case where the device has been registered and has all required content information and the player program plays the content information normally, schedule file information is read from the local profile, and the content information is displayed according to a preset time cycle or based on a set time parameter;

whether the schedule file information includes the content information A is detected; if the content information A is detected in the schedule file information, an API provided by a retailer/supermarket is connected to a retailer/supermarket POS system by broadband connection, and after the API is successfully connected to the retailer/supermarket POS system, latest information of products is acquired in real time from the content information A and stored in the local profile; and if the API fails to be connected to the retailer/supermarket POS system, the content information A stored in the local profile is displayed.

Further, according to the control method, in a case where the device has been registered and has all required content information and the player program plays the content information normally, the content information stored in the local profile is updated;

if a global player update frequency is specified in the configuration, the program pings the server to check for new updates in the background;

if a new update flag on the server is true, the program downloads new schedule file information and contents into the local profile in the background;

After downloading new schedule and content information successfully into local profile, local configuration file is updated and the program is automatically restarted and refreshes display contents according to a new schedule.

Further, according to the control method, in the step of playing, when a user in approaches a door, different stored content information is display by the preset player program through a transparent LCD screen module by means of a camera assembly.

Further, according to the control method, program checks if a person is approaching the door by means of the camera assembly, a computer vision model stored in the local profile is used to detect person/face and depth information;

when the player program is started, a default proximity value DP is read from the local profile;

video frames are captured by the camera assembly;

each video frame received from the camera assembly is analyzed to detect persons/faces;

a person/face distance D is calculated; if the person/face distance D is equal to or less than the default proximity value DP, the player program displays content information A; otherwise, the player program plays content information B;

person/face features are acquired by the camera assembly to recognize a user group, and the local profile is searched to further display stored content information suitable for the user group in the form of overlay display or by creating a new window.

Further, according to the control method, in a case where a person/face distance D is calculated, and if the person/face distance D is equal to or less than the default proximity value DP, the player program displays content information A, after the player program plays the content information A, the camera assembly continues to capture video frames; if the person/face distance D is beyond the range of the default proximity value DP, the player program will hide the content information A X seconds later from the last time a person/face is detected, and a default/loop schedule is displayed; if it is detected within a preset time that the person/face distance D is within the range of the default proximity value DP, the player program plays the content information A again and plays the content information B the preset time later.

Further, according to the control method, in the step of playing, according to whether a user is approaching a door, different stored content information by the preset player program through a transparent LCD screen module, whether a person is approaching the door is detected by means of a distance sensor, and different stored content information is displayed by the preset player program through the transparent LCD screen module.

Further, according to the control method, in a case where whether a person is approaching the door is detected by means of the distance sensor and different stored content information is displayed by the preset player program through the transparent LCD screen module, when the player program is started, a default proximity value DP is read from a local profile, and the player program establishes a serial communication with the distance sensor by means of a script;

distance information is acquired by the distance sensor;

each piece of serial information received from the sensor is analyzed to infer/detect a motion and proximity;

if a Motion or movement is detected, the script calculates a proximity distance D acquired from the serial information;

if the proximity distance D is equal to less than the default proximity value DP, the script sends to the player program a command indicating the presence of a person in front of a screen, and the player program plays content information A;

if the content information A is visible, the program searches for local schedule file information to detect whether content information corresponding to the Proximity value matching the received information is scheduled;

if matching contents are detected, the matching contents are displayed in the form of an advertisement overlaid on the content information A or in a specific region created therefor;

the script continuously receives Proximity value and checks the distance from the motion to the screen; if the proximity distance D of the motion is beyond the range of the default proximity value DP, the player program will hide the content information A X seconds later from the last time the motion is detected, and a default/loop schedule is displayed; and if it is detected within a preset time that the proximity distance D of the motion is within the range of the default proximity value DP, the player program plays the content information A again and plays content information B the preset time later.

In a third aspect, the invention provides a control device for a transparent LCD screen of a refrigerator, comprising:

a processor;

a wireless connection module in communication connection with a server;

a camera assembly configured to acquire image information of a person approaching a door;

a distance sensor module configured to acquire motion information of the person approaching the door;

a storage module configured to store at least commodity content information and advertisement content information; and an external module connected to an external input device.

It can be known from the above technical solutions that, compared with the prior art, the invention has the following beneficial technical effects:

1. In the invention, the transparent LCD screen is arranged in the door of the refrigerator, and the door of the refrigerator is made from glass, such that products stored in the refrigerator can be observed directly through the door; the transparent LCD screen arranged in the door of the refrigerator can display content information A and content information B; when a user is approaching the refrigerator, the transparent LCD screen plays the content information A (related information of the products), the user can check information of the products, such as selling price, origin and producer, through the transparent LCD screen and can also directly observe the products in the refrigerator through the transparent LCD screen; when no user is approaching the refrigerator, the transparent LCD screen plays the content information B (advertisement content information) as an advertising screen;

2. In the invention, the camera assembly is used for recognizing persons/faces, and the distance sensors are used for detecting motions of users, such that whether a user is approaching the refrigerator can be effectively determined, and the player program is controlled to play different contents; if no user is approaching the refrigerator, the transparent LCD screen plays content information B (advertisement content information) to promote products in the refrigerator or other products; when a user is approaching the refrigerator, the transparent LCD screen plays content information A, and the user selects corresponding products according to the content information A;

3. In the invention, the transparent LCD screen may be a touch screen, such that users can select corresponding content information A through the touch screen to gain a better understanding of products; or, the control assembly is connected to an external device, and required content information A is selected, searched and checked by inputting an instruction through the external device;

4. In the invention, the second frame is mounted on the front side of the door and covers the side edges of the door, and the transparent LCD screen module and the control assembly can be detached synchronously when the outer door assembly is detached, such that the transparent LCD screen and the control assembly can be maintained conveniently without detaching the entire door.

BRIEF DESCRIPTION OF DRAWINGS

To more clearly explain the technical solutions of the embodiments of the invention or the prior art, drawings used for describing the embodiments of the invention or the prior art will be briefly introduced below. Obviously, the drawings in the following description are merely illustrative ones of the invention, and those ordinarily skilled in the art can obtain other drawings according to the following ones without creative labor.

Figure 1:
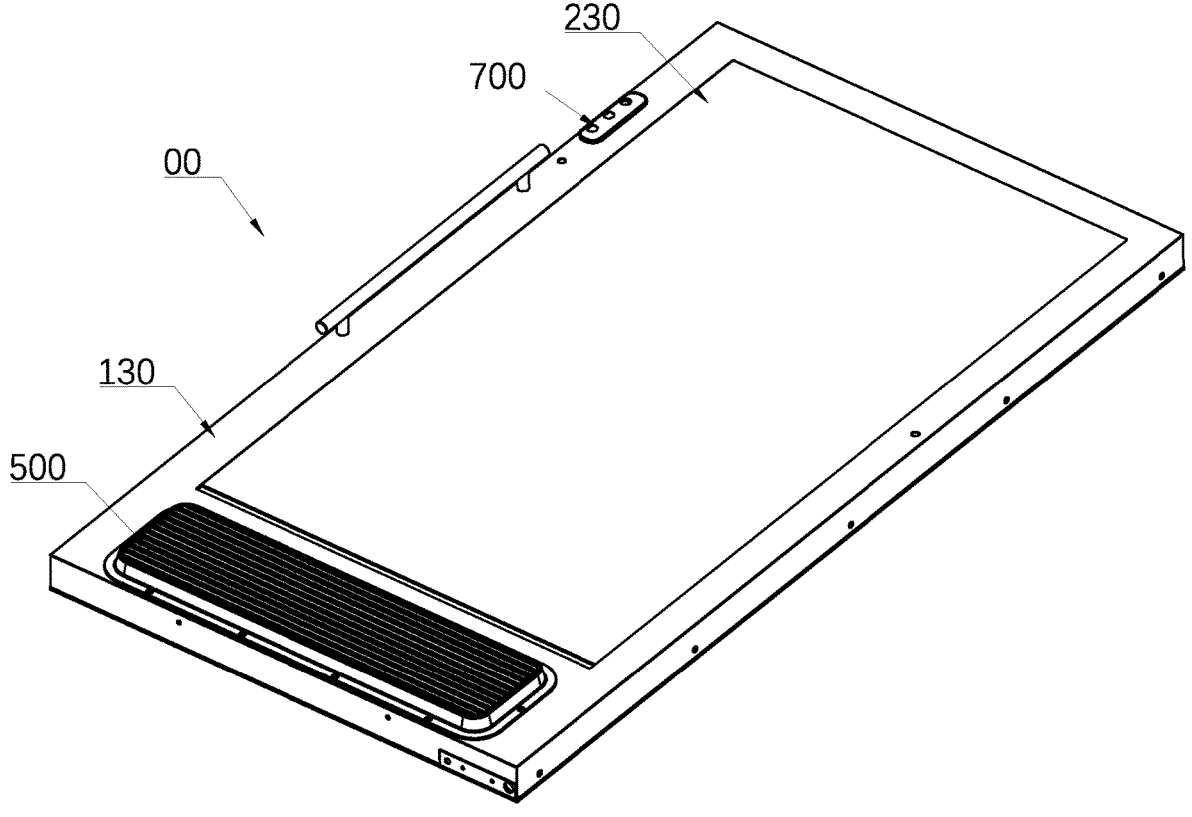
FIG. 1 is a schematic diagram of a door of a refrigerator easy to maintain and provided with a transparent LCD screen according to the invention.

REFERENCE SIGNS 00, door; 110, first frame; 120, bracket; 130, second frame; 131, first frame plate; 132, second frame plate; 133, opening; 201, first gap; 210, first glass panel; 220, second glass panel; 230, third glass panel; 300, transparent LCD screen module; 301, second gap; 310, LCD screen; 320, light guide plate; 400, silicone sealing assembly; 410, sealing strip; 420, sealing strip holder; 500, control assembly; 510, support plate; 520, surface cover; 530, LCD screen logic panel; 540, screen driver board; 550, power board; 560, mini pc; 570, protective cover; 700, camera assembly; 800, distance sensor.

DESCRIPTION OF EMBODIMENTS

The invention will be described in further detail below in conjunction with accompanying drawings. All these accompanying drawings are simplified schematic diagrams for illustratively describing the basic structures of the invention, so only components related to the invention are shown in these drawings.

Embodiment 1

Figure 3:
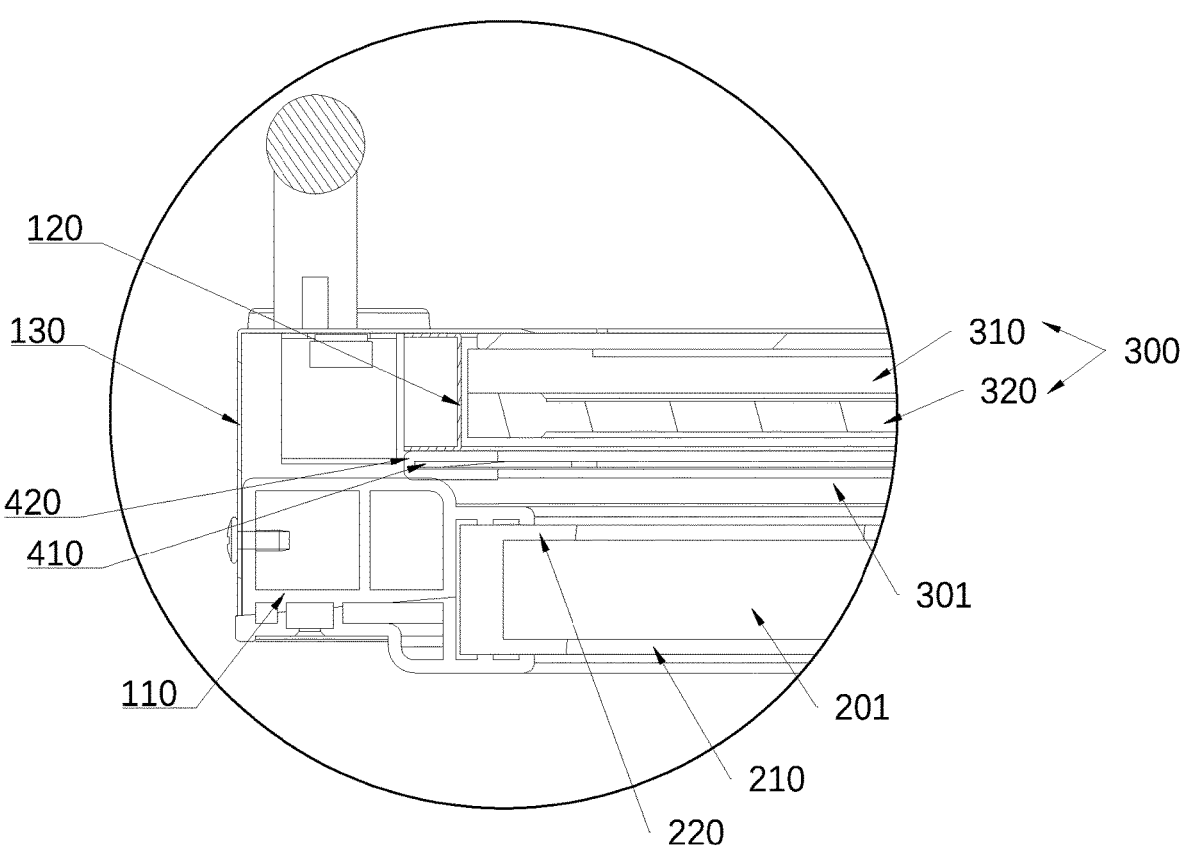
FIG. 3 is an enlarged view of part A in FIG. 2.
Figure 4:
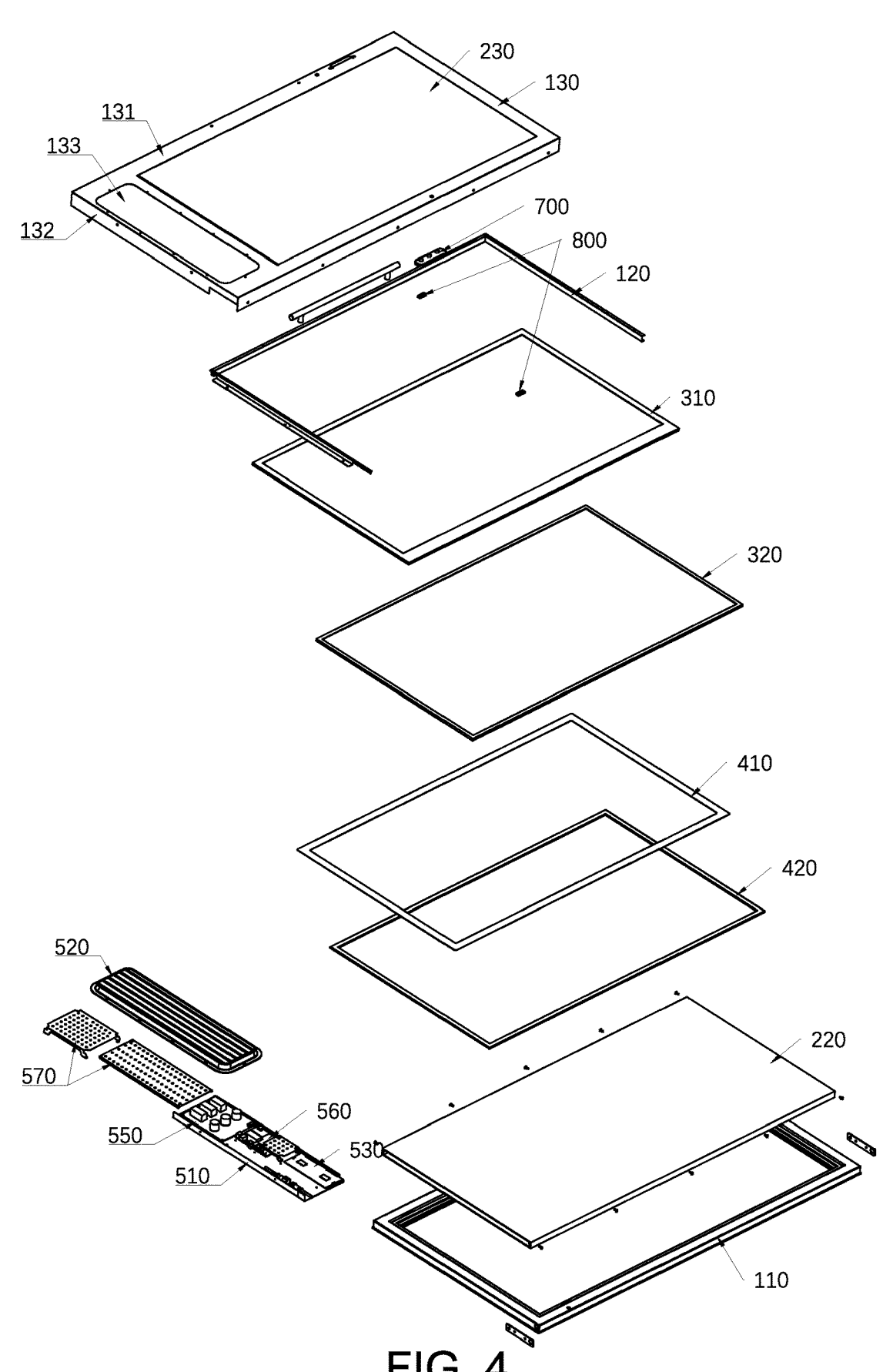
FIG. 4 is an exploded view of the door of the refrigerator easy to maintain and provided with a transparent LCD screen according to the invention.

A refrigerator easy to maintain and provided with a transparent LCD screen comprises a main body and a door 00, wherein the door 00 is mounted on the main body and controls a refrigerating chamber of the main body to open or close;

Referring to FIG. 1-FIG. 4, the door 00 comprises an inner door assembly, an outer door assembly, a transparent LCD screen module 300 and a control assembly 500;

The inner door assembly comprises a first frame 110, and a first glass panel 210 and a second glass panel 220 which are mounted on the first frame 110, and a first gap 201 is formed between the first glass panel 210 and the second glass panel 220;

As shown in FIG. 4, the first frame 110 is rectangular and may be made from metal, and the first glass panel 210 and the second glass panel 220 are fixedly mounted in the first frame 110. It can be understood that the first glass panel 210 and the second glass panel 220 form two layers of glass, which can reduce cold transferred from the refrigerating chamber to the outside to reduce cold-heat exchange, thus reducing water mist generated on the first glass panel 210 and the second glass panel 220. In this way, the influence of water mist on the visual effect is reduced, and users can easily observe products in the refrigerating chamber and contents displayed by the transparent LCD screen module 300;

Optionally, the first glass panel 210 and the second glass panel 220 may be separated from each other and both mounted on the first frame 110, as shown in FIG. 3, edges of the first glass panel 210 and the second glass panel 220 are connected to form two layers of glass, a first gap 201 is formed between the first glass panel 210 and the second glass panel 220, and the first gap 201 is not connected to the outside, so moisture cannot enter the first gap 201;

The outer door assembly comprises a second frame 130 and a third glass panel 230 mounted on the second frame 130; the transparent LCD screen module 300 and the control assembly 500 are both fixed to the second frame 130;

The transparent LCD screen module 300 and the control assembly 400 are limited in a cavity formed between the inner door assembly and the outer door assembly;

The outer door assembly covers an outer surface and side edges of the door 00 and can be detached together with the transparent LCD screen module 300 and the control assembly 500 from the door; as shown in FIG. 1 and FIG. 4, the second frame 130 is provided with a first frame plate 131 covering a front side of the door and a second frame plate 132 covering the side edges of the door; when installed, the outer door assembly is assembled on an outer side of the door, and structures such as metal sheets and rotating shafts between the door body and the main body of the refrigerator are all arranged on the first frame 110, such that when the refrigerator needs to be maintained after the door is mounted on the refrigerator, the transparent LCD screen module 300 and the control assembly 400 can be maintained by detaching the outer door assembly 400, and it is unnecessary to detach the entire door of the refrigerator, thus facilitating maintenance or replacement.

Further, the second frame 130 is fixed to the first frame 110 through screws to fix the outer door assembly and the inner door assembly together. In this way, when the refrigerator is disassembled for maintenance, the screws are loosened to detach the outer door assembly together with the transparent LCD screen module 300 and the control assembly 500, and then the transparent LCD screen module 300 and the control assembly 500 can be maintained or replaced.

Specifically, the transparent LCD screen module 300 is mounted on the second frame 130 and comprises an LCD screen 310 and a light guide plate 320, wherein the LCD screen 310 is located on a front side of the light guide plate 320, the second glass panel 220 is located on a back side of the light guide plate 320, a second gap 301 is formed between the light guide plate 320 and the second glass panel 220, and the second gap 301 can prevent cold from being transferred to the light guide plate 320, thus further reducing cold-heat exchange.

A silicone sealing assembly 400 is arranged between the transparent LCD screen module 300 and the second glass panel 220 and pressed between the first frame 110 and the second frame 130 to seal the second gap 301, thus preventing moisture from entering the second gap 301.

The control assembly 500 is mounted on the second frame 130 and located below the transparent LCD screen module 300, and a surface cover 520 for covering the control assembly 500 is detachably mounted on a front side of the second frame 130 and provided with heat dissipation holes.

Figure 2:
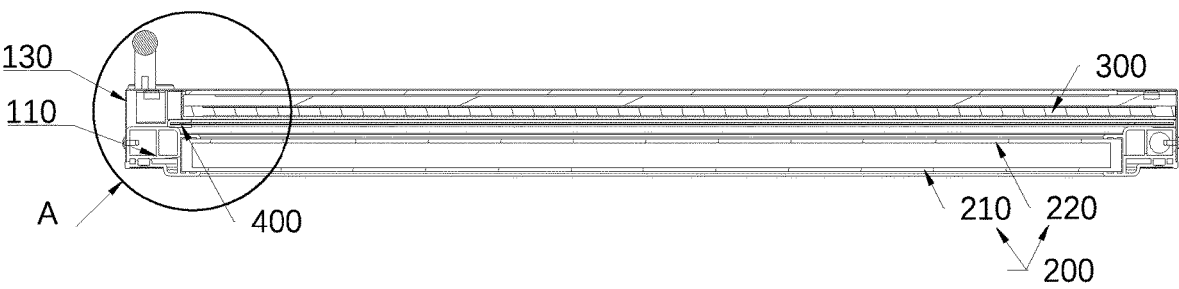
FIG. 2 is a sectional view of the door of the refrigerator easy to maintain and provided with a transparent LCD screen according to the invention.

As show in FIG. 2, a first groove is formed in an inner side of the first frame 110, and the edges of the first glass panel 210 and the second glass panel 220 are inlaid and mounted in the first groove after being connected; the transparent LCD screen module 300 is mounted on the second frame 130; a bracket 120 is arranged on a back side of the second frame 130, and the bracket 120 is fixed to the back side of the second frame 130 and corresponds to the edge of the transparent LCD screen module 300; and, the silicone sealing assembly 400 is pressed against the first frame 110 by means of the bracket 120.

The first frame 110 is rectangular, a first mounting region is formed in the middle of the first frame 110, the first glass panel 210 and the second glass panel 220 are mounted in the first mounting region, and the area of the first glass panel 210 and the area of the second glass panel 220 are greater than the area of the transparent LCD screen module 300.

The silicone sealing assembly 400 comprises a sealing strip 410 and a sealing strip holder 420, the sealing strip holder 420 is provided with a second groove, and the sealing strip 410 is inlaid and mounted in the second groove and extends towards the center of the second frame 130.

The second frame 130 is rectangular on the whole and half covers the door; as shown in FIG. 3 and FIG. 4, the silicone sealing assembly 400 is located between the first frame 110 and the second frame 130 and can prevent moisture from entering the second gap 301 to reduce cold-heat exchange, thus preventing water mist; the silicone sealing assembly 400 fulfills a sealing and waterproof effect.

The second frame 130 has a second mounting region, the third glass panel 230 is mounted in the second mounting region, the area of the second mounting region is greater than or equal to the area of the transparent LCD screen module 300, and users can observe the contents displayed by the transparent LCD screen module 300 through the third glass panel 230;

Optionally, the first glass panel 210, the second glass panel 220 and the third glass panel 230 may be all provided with anti-mist films to further improve the anti-mist effect, and the first glass panel 210, the second glass panel 220 and the third glass panel 230 may be all made from tempered glass, which is high in hardness and explosion-proof.

Further, the control assembly 500 comprises a support plate 510, an LCD screen logic panel 530, a screen driver board 540, a power board 550 and a mini pc (personal computer) 560; the LCD screen logic panel 530, the screen driver board 540, the power board 550 and the mini pc 560 are all mounted on the support plate 510, and a protective cover 570 with vent holes 571 is arranged corresponding to the LCD screen logic panel 530, the screen driver board 540, the power board 550 and the mini pc 560;

The second frame 130 is provided with an opening 133, the surface cover 520 is arranged corresponding to the opening 133, the control assembly 500 is mounted in the cavity formed between the inner door assembly and the outer door assembly and exactly faces the opening 133, and the surface cover 520 covers the control assembly 400.

The control assembly 500 is provided with at least one type of wire port, and after the surface cover 520 is detached, the wire port is uncovered, such that workers can connect external equipment to a system through the wire port when maintaining the refrigerator.

The control assembly 500 is located below the transparent LCD screen module 300 and corresponds to the surface of the second glass panel 220, the support plate 510 is fixedly mounted on the second frame 130, and the surface cover 520 is mounted on the second frame 130.

Figure 5:
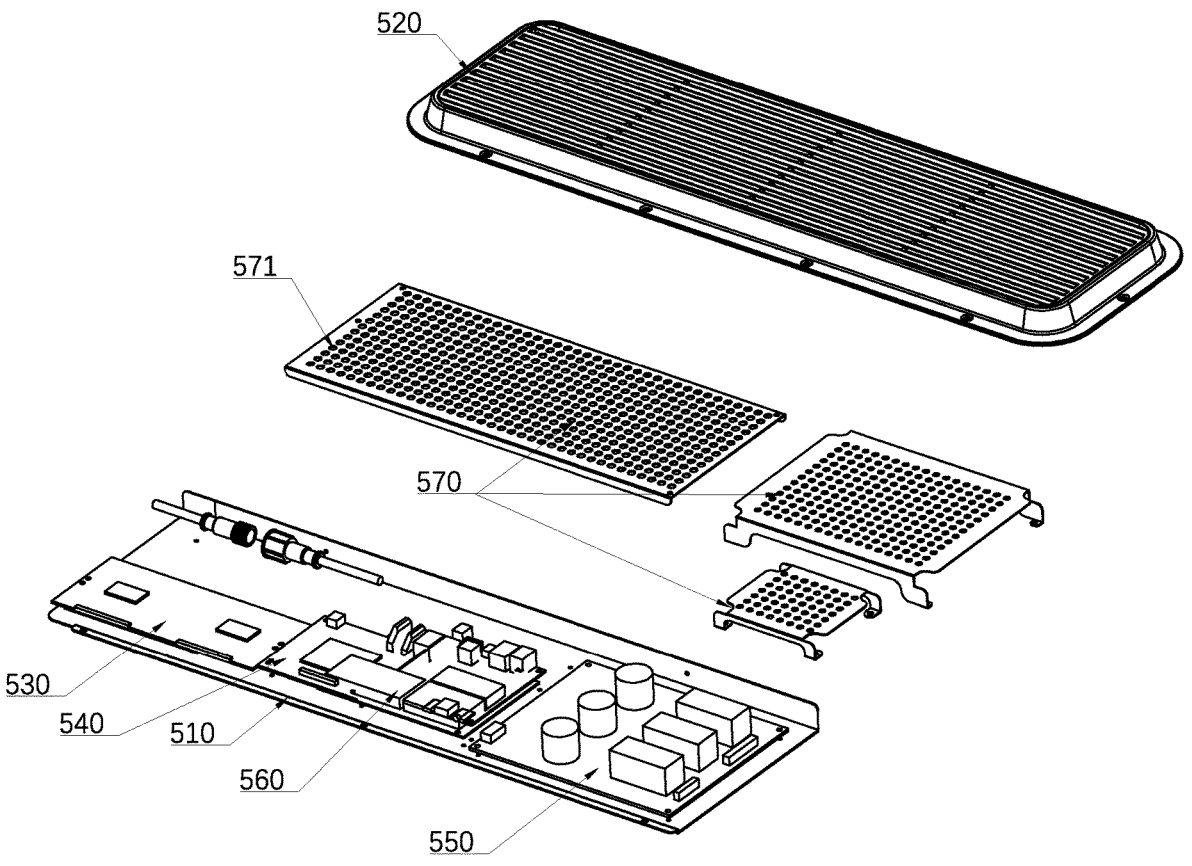
FIG. 5 is an exploded view of a control assembly of an LCD screen of the refrigerator according to the invention.

The control assembly 500 is mounted on the door, thus being easy to detach and maintain; as shown in FIG. 5, the protective cover 570 with the vent holes 571 is arranged corresponding to the transparent LCD screen logic panel 530, the screen drive board 540, the power board 550 and the mini pc 560, such that a protection effect is realized, and heat can be dissipated through the vent holes 571; the surface cover 520 is provided with heat dissipation holes, and the vent holes 571 and the heat dissipation holes are connected to the outside, such that heat generated during operation of the control assembly 500 can be dissipated to the outside;

The protective cover 570 may be locked to the support plate 510 through screws, and a dual protection effect is realized by means of the protective cover 570 and the surface cover 520.

The control assembly 500 may be connected to an external input device, such as a keyboard, mouse or a USB flash disk, through the wire port; it can be understood that after the control assembly 500 is connected to an external device, the mini pc 560 is used as a mainboard, the external device is used as an input device, and the transparent LCD screen module 300 is used as a display screen, thus facilitating circuit maintenance of the door.

The control assembly 500 is mounted on the door and is isolated from the refrigerating chamber by the first glass panel 210 and the second glass panel 220, such that heat generated during operation of the control assembly 500 will not be transferred into the refrigerating chamber.

As shown in FIG. 1, when the refrigerator is maintained, the transparent LCD screen module 300 and the control assembly 500 can be maintained easily and quickly after the outer door assembly is detached, and it is unnecessary to detach the entire door;

The control assembly 500 can be separately maintained merely by detecting the surface cover 520 and the protective cover 570 when needed.

Further, the refrigerator easy to maintain and provided with a transparent LCD screen further comprises a camera assembly 700 and distance sensors 800, wherein the camera assembly 700, the transparent LCD screen module 300 and the distance sensors 800 are all electrically connected to the control assembly 500, the camera assembly 700 is mounted at a high position on the door, the distance sensors 800 are mounted on the front side of the door, and the two distance sensors 800 are symmetrically distributed left and right.

The camera assembly 700 acquires and captures video frames, and the mini pc 560 compares the video frames to determine whether a person/face is approaching the door of the refrigerator;

The distance sensors 800 sense whether there is a motion of a user and whether the motion is towards the door of the refrigerator;

The mini pc 560 determines, according to information/signals from the camera assembly 700 and/or the distance sensors, whether a person/face is approaching the door of the refrigerator to display different contents by means of the transparent LCD screen module 300.

Specifically, when it is detected that no person/face is approaching the door of the refrigerator, the transparent LCD screen module 300 displays advertisements to fulfill a promotion effect, such that an extra advertising lamp box or an extra LCD advertising board at the top of the refrigerator is not needed anymore; the contents displayed by the transparent LCD screen module 300 can be set;

When it is detected that a person/face is approaching the door of the refrigerator, the transparent LCD screen module 300 plays content information A responded from the refrigerating chamber, such as pictures, origin and production date of products; users can see products in the refrigerating chamber through the transparent LCD screen module 300.

Specifically, the camera assembly 700 is equipped with a 13 mega-pixel central RGB camera with a field angle of 70°, two monochrome cameras for stereoscopic deep measurement, and an Intel Movidius Myriad X VPU capable of performing computer vision inference in equipment; the distance sensor is a presence sensor with an adjustable field angle of 27° and based on the time-of-flight principle and can detect humans within 2.5 m; the hardware ecosystem can detect multiple faces at the same time and can collect vital statistic information and dwell time of each face/user.

In addition, the distance sensor used in the invention may be a Nexmosphere XY series sensor used for detecting and analyzing the presence, distance and vital statistic information of users in front of an interactive display screen or a nameplate device. The sensor can provide corresponding inputs within an XY range no matter whether users want to trigger correct contents at the proper time, introduce arresting lighting changes by programming to increase the degree of participation, or want to collect valuable data.

Wherein, the X-Eye Presence & Airbutton sensor is an infrared time-of-flight sensor and can detect whether an object or person is present, and if so, indicate the distance to the person, such that multiple trigger regions can be realized. In addition, the sensor has a dedicated Airbutton region for detecting touchless inputs of users when users place their hands in front of the sensor.

The X-Eye Presence & Airbutton sensor can perform distance measurement, has an adjustable field angle of 27°, a detection distance as long as 250 cm, and a dedicated Airbutton region for detecting touchless inputs of users;

Moreover, the X-Eye Presence & Airbutton sensor can be easily connected to any Nexmosphere Xperience controller by means of an X-talk interface, and all setting of the sensor can be programmed on the controller, thus realizing seamless integration in an App of users.

Embodiment 2

A control method for a transparent LCD screen of a refrigerator comprises the following steps:

stating a player program and determining content information to be played; and playing, according to whether a user is approaching a door, different content information by the preset player program through a transparent LCD screen module.

Further, according to the control method, in the step of stating a player program and determining content information to be played, in a case where the player program is started on a device for the first time, the player program searches for content information stored in a local profile and determines, according to searched content information, whether the device has been registered; if the device has been registered and has all required content information, the player program plays the content information normally; otherwise, the device is registered and activated first, and then all required content information is downloaded from a server and stored in the local profile.

Further, according to the control method, the content information includes: storage device ID applied to the local profile, a registration and activation code, an activation date, content information A, content information B, camera assembly configuration information and distance sensor configuration information.

Figure 7:
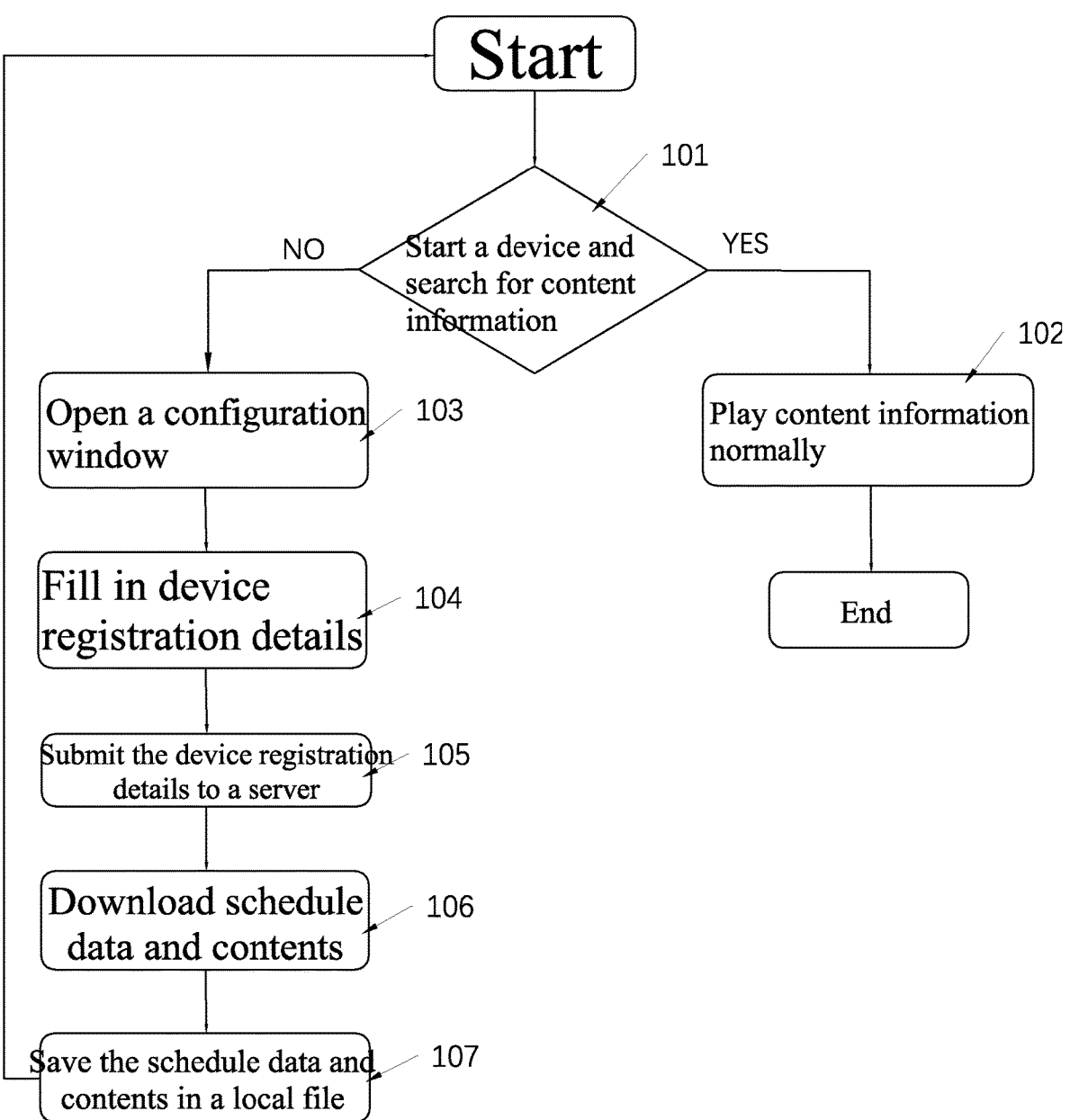
FIGS. 7-10 are flow diagrams of a control method of the LCD screen of the refrigerator according to the invention.

As shown in FIG. 7, the specific execution steps are as follows:

S101: when started on the device for the first time, the player program determines, by searching, whether the local profile includes the storage device ID applied to the local profile, the registration and activation code, the activation date, the content information A, the content information B, the camera assembly configuration information and the distance sensor configuration information;

S102: if the local profile includes all the required content information in S101, the player program will play the content information normally;

S103: if the local profile is not found or lacks the required content information in S101, a configuration window will be opened;

S104: the user inputs or selects server and playlist related information in the configuration window;

S105: after being selected, the server and playlist related information is submitted to a server to register and activate the device;

S106: after the device is registered successfully, related schedule file information/playlist information/schedule data and preset contents are downloaded; and S107: after the related schedule file information/playlist information/schedule data and the preset contents are downloaded successfully, latest configuration information is stored in the local profile.

Further, according to the control method, in a case where the device has been registered and has all required content information and the player program plays the content information normally, schedule file information is read from the local profile, and the content information is displayed according to a preset time cycle or based on a set time parameter;

whether the schedule file information includes the content information A is detected; if the content information A is detected in the schedule file information, an API provided by a retailer/supermarket is connected to a retailer/supermarket POS system by broadband connection, and after the API is successfully connected to the retailer/supermarket POS system, latest information of products is acquired in real time from the content information A and stored in the local profile; if the API fails to be connected to the retailer/supermarket POS system, the content information A stored in the local profile is displayed.

It should be noted that the content information A and the content information B are set according to demands of users. For example, the content information A may be digital shelf image information, product images, product introductions, product price, promotional information or the like; and the content information B may be advertisements of products in the refrigerator, advertisements of products that will come into the market, or advertisements of other products.

The control method is described in detail below taking the content information A as digital shelf image information as an example.

Further, according to the control method, in a case where the device has been registered and has all required content information and the player program plays the content information normally, the content information stored in the local profile is updated;

if a global player update frequency is specified in the configuration, the program pings the server to check for new updates in the background;

if a new update flag on the server is true, the program downloads new schedule file information and contents into the local profile in the background;

After downloading new schedule and content information successfully into local profile, local configuration file is updated and the program is automatically restarted and refreshes display contents according to a new schedule.

Figure 8:
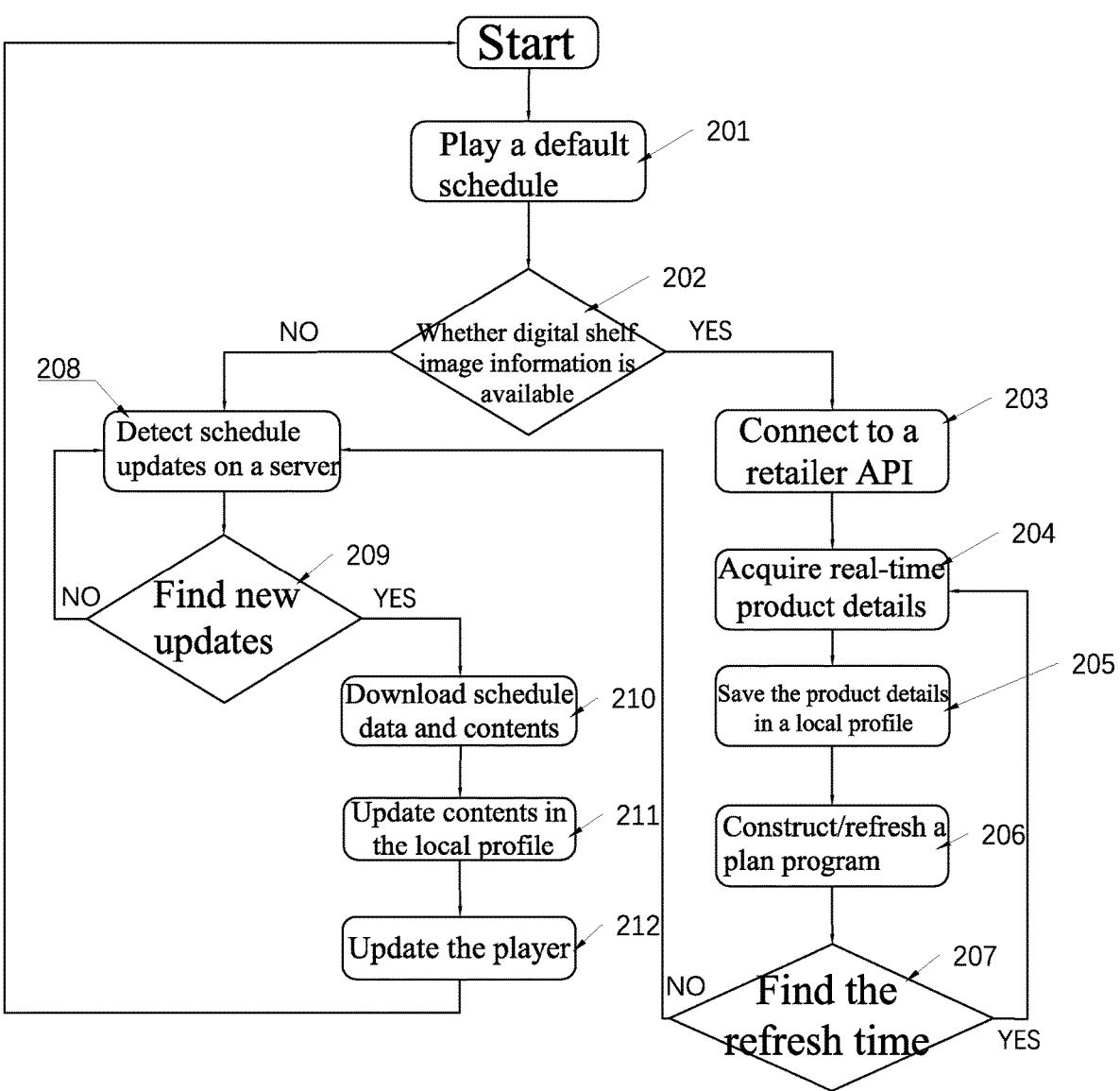

Specifically, as shown in FIG. 8,

S201: when started on the device, the player program reads schedule file information from the local profile and displays contents according to a preset time cycle or based on a set time parameter;

S202: the program checks whether there is digital shelf image information in the local profile;

S203: if the digital shelf image information is detected in the local profile, an API provided by a retailer/supermarket is connected to a retailer/supermarket POS system by broadband connection;

S204: if the API is successfully connected to the retailer/supermarket POS system, the program acquires latest digital shelf image information in real time; if the API fails to be connected to the retailer/supermarket POS system, the program displays the digital shelf image information stored in the local profile;

S205: the program updates the digital shelf image information in the local profile;

S206: when initial digital shelf image information is collected successfully, the program will construct digital shelf image information according to the design of a CMS content management system used; the program constructs the digital shelf image information according to data collected by the API to display product images/videos, price and other promotional contents, and users can design shelf images, including price tags, on the server by means of an editor of the CMS content management system, such that manual placement of price tags and promotional banners is eliminated, and it is ensured that price information on a refrigerator/freezer unit is latest;

S207: if a digital shelf image information update interval is set on the server, the program will perform S203-S206 at the specified interval;

S208: if a global player update frequency is specified in the configuration, the program will ping the server to check for new updates in the background;

S209/S210: if a new update flag on the server is true, the program will download new schedule file information and content information into the local profile in the background;

S211: when updating is completed successfully, new configuration and schedule file information is stored/updated in the local profile; and S212: after the information is successfully stored and updated, the program is automatically restarted and refreshes display contents according to a new schedule.

Further, according to the control method, in the step of playing, when a user approaches a door, different stored content information is display by the preset player program through a transparent LCD screen module by means of a camera assembly.

Further, according to the control method, program checks if a person is approaching the door by means of the camera assembly, A computer vision model stored in the local profile is used to detect person/face and depth information;

when the player program is started, a default proximity value DP is read from the local profile;

video frames are captured by the camera assembly;

each video frame received from the camera assembly is analyzed to detect persons/faces;

a person/face distance D is calculated; if the person/face distance D is equal to or less than the default proximity value DP, the player program displays content information A; otherwise, the player program plays content information B;

person/face features are acquired by the camera assembly to recognize a user group, and the local profile is searched to further display stored content information suitable for the user group in the form of overlay display or by creating a new window.

Further, according to the control method, in a case where a person/face distance D is calculated, and if the person/face distance D is equal to or less than the default proximity value DP, the player program displays content information A, after the player program plays the content information A, the camera assembly still captures video frames; if the person/face distance D is beyond the range of the default proximity value DP, the player program will hide the content information A X seconds later from the last time a person/face is detected, and a default/loop schedule is displayed; if it is detected within a preset time that the person/face distance D is within the range of the default proximity value DP, the player program plays the content information A again and plays the content information B the preset time later.

Figure 9:
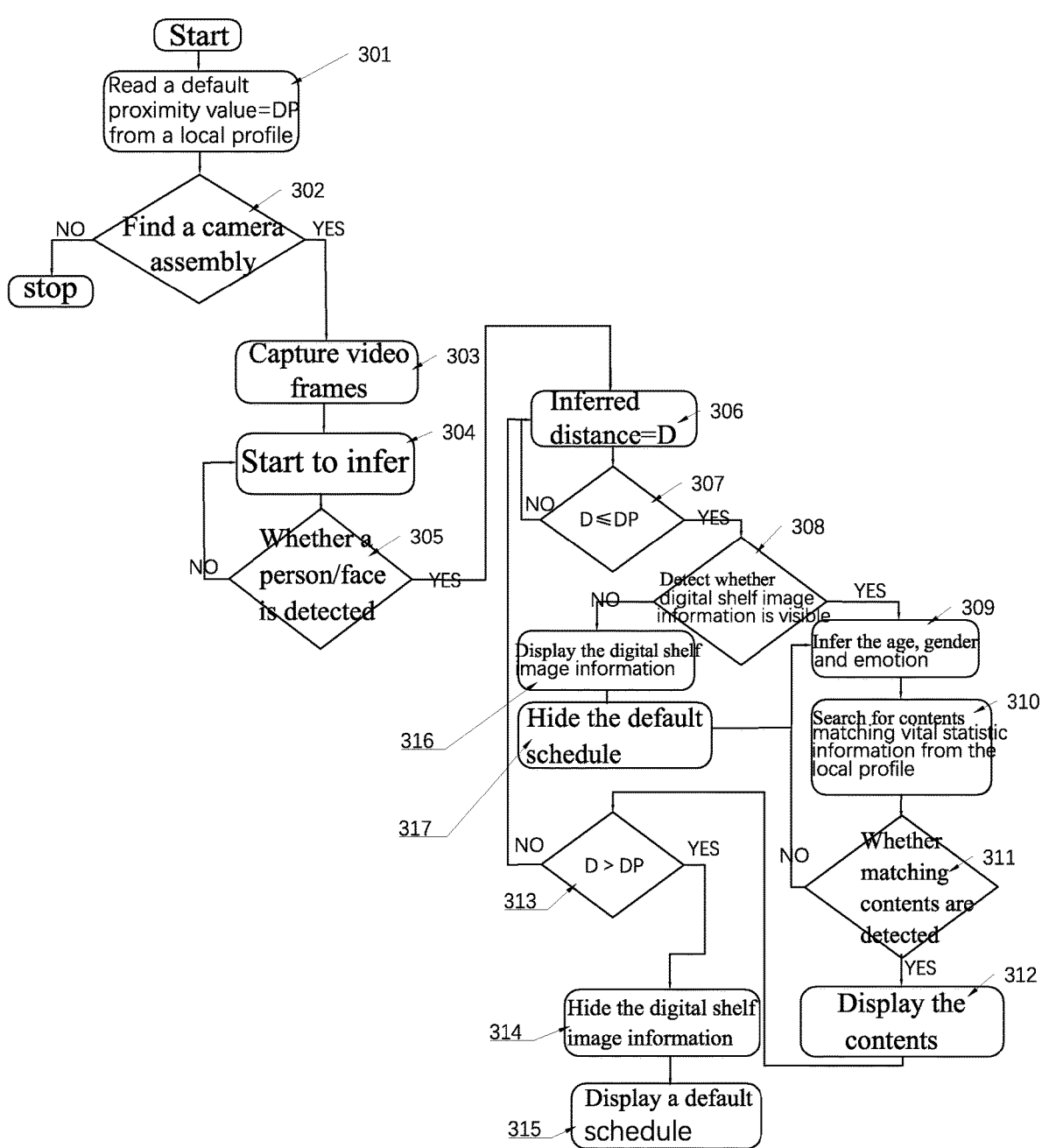

Specifically, as shown in FIG. 9,

S301: when started on the device, the player program reads a default proximity value DP from the local profile;

S302: if a camera assembly is available, the program establishes a connection to the camera assembly through a script and deploys a computer vision model to detect persons/faces and depth information;

S303: the script starts the camera assembly as a background process to capture video frames;

S304: the script analyzes each video frame received from the camera assembly to detect persons/faces;

S305/S306: if a person/face is detected, the script calculates a person/face distance (D) from the depth information;

S307: if the person/face distance D is equal to or less than the default proximity value DP, the script sends to the program a command indicating the presence of a user in front of a screen;

S308: after receiving the command, the program detects whether digital shelf image information is visible;

S309: if the digital shelf image information is visible, the script sends vital statistic inference information such as age, gender and emotional details;

S310: according to the vital statistic inference information, the program searches for local schedule file information to detect whether digital contents of the vital statistic parameter matching the received information are scheduled;

S311/S312: if matching contents are detected, the contents are displayed in the form of an advertisement overlaid on the digital shelf image information, or in a specific region created therefor;

S313: the script continuously receives camera-inferred information and detects the distance of a face to the screen;

S314: if the person/face distance D is beyond the range of the default proximity value DP, the player program will hide the digital shelf image information X seconds later from the last time a person/face is detected;

S315: the digital shelf image information displays a default/loop schedule;

S316: when the person/face distance D is within the range of the default proximity value DP and the digital shelf image information is invisible, the program displays the digital shelf image information; and S317: the default/loop schedule is disabled and hidden, and the program performs S309-S315.

Further, in use, the camera assembly acquires video frames; when it is inferred that no person/face feature is present, a transparent LCD screen module displays advertisement content information stored in the local profile, and the advertisement content information is displayed by the transparent LCD screen module in the form of images or animations; when it is inferred that a person/face feature is present, the transparent LCD screen module displays the digital shelf image information and determines, according to obtained video frames, user features, for example, man or woman, adult or child; vital statistic information has been stored in the server or the local profile, and the vital statistic information mainly includes recommendations offered according to preferences of user groups of different genders and ages, for example, if it is inferred that the user is a man, products suitable for men, such as functional drinks, may be displayed on the digital shelf image information in the form of an advertisement; for another example, if it is inferred that the user is a child, a window may be established on the digital shelf image information to display products suitable for children, such as milk or fruit juice, in the form of an advertisement.

In the step of playing, according to whether a user approaches a door, different stored content information by the preset player program through a transparent LCD screen module, whether a person is approaching the door is detected by means of a distance sensor, and different stored content information is displayed by the preset player program through the transparent LCD screen module.

Further, according to the control method, in a case where whether a user approaches the door is detected by means of the distance sensor and different stored content information is displayed by the preset player program through the transparent LCD screen module, when the player program is started, a default proximity value DP is read from the local profile, and the player program establishes a serial communication with the distance sensor by means of a script;

distance information is acquired by the distance sensor;

each piece of serial information received from the sensor is analyzed to infer/detect a motion and proximity;

if a Motion or movement is detected, the script calculates a proximity distance D acquired from the serial information;

if the proximity distance D is equal to less than the default proximity value DP, the script sends to the player program a command indicating the presence of a user in front of a screen, and the player program plays content information A;

if the content information A is visible, the program searches for local schedule file information to detect whether digital contents corresponding to the Proximity value matching the received information are scheduled;

if matching contents are detected, the matching contents are displayed in the form of an advertisement overlaid on the content information A, or in a specific region created therefor;

the script continuously receives Proximity value and checks the distance from the motion to the screen; if the proximity distance D of the motion is beyond the range of the default proximity value DP, the player program will hide the content information A X seconds later from the last time the motion is detected, and a default/loop schedule is displayed; if it is detected within a preset time that the proximity distance D of the motion is within the range of the default proximity value DP, the player program plays the content information A again and plays content information B the preset time later.

Figure 10:
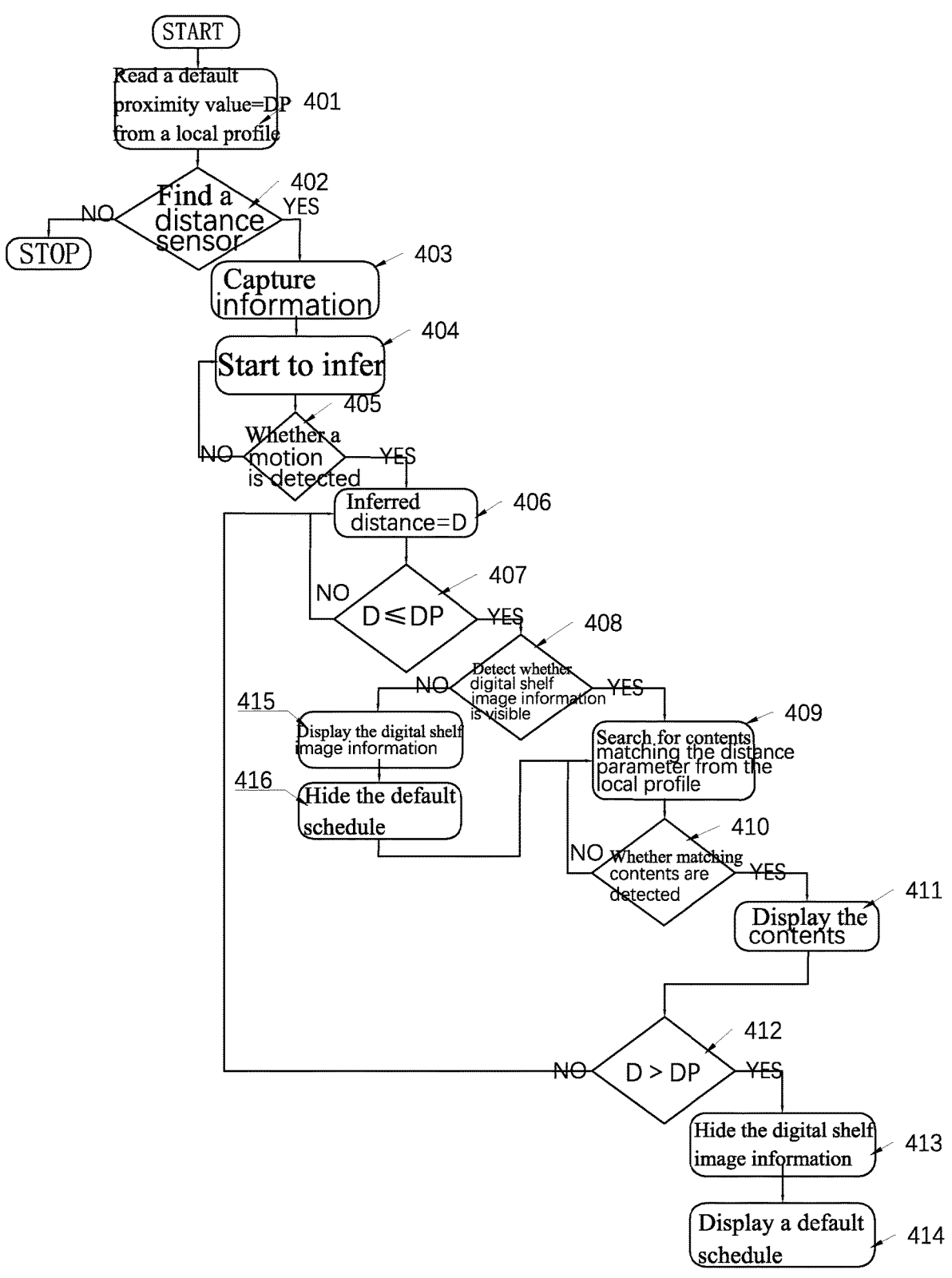

Specifically, referring to FIG. 10,

S401: when started on the device, the player program reads a default proximity value DP from the local profile;

S402: if a distance sensor is available, the player program establishes serial communication with the distance sensor by means of a script;

S403: the script starts the distance sensor as a background process to capture information;

S404: the script analyzes each piece of serial information received from the distance sensor to detect a motion and proximity;

S405/S406: if a Motion or movement is detected, the script calculates a proximity distance D acquired from the serial information;

S407: if the proximity distance D is equal to less than the default proximity value DP, the script sends to the player program a command indicating the presence of a user in front of a screen,

S408: after receiving the command, the program detects whether digital shelf image information is visible;

S409: if the digital shelf image information is visible, the program searches for local schedule file information and detects whether contents of the Proximity value matching received information are scheduled;

S410/S411: if matching contents are detected, the contents are displayed in the form of an advertisement overlaid on the digital shelf image information, or in a specific region created therefor;

S412: the script continuously receives Proximity value and detects the distance from the motion to the screen;

S413: if the proximity distance D of the motion is beyond the range of the default proximity value DP, the player program will hide the digital shelf image information X seconds later from the last time the motion is detected;

S414: the digital shelf image information displays a default/loop schedule;

S415: when the person/face proximity distance D is within the range of the default proximity value DP and the digital shelf image information is invisible, the program displays the digital shelf image information; and

S416: the default/loop schedule is disabled and hidden, and the program performs S409-S414.

In this embodiment, the camera assembly and the distance sensor may be both arranged on a door of a refrigerator, the camera assembly detects person/face features, and the distance sensor monitors the distance from the person/face features to the door of the refrigerator;

In S409, if the digital shelf image information is visible, the program searches for local schedule file information and detects whether contents of the Proximity value matching the received information are scheduled; when the detection sensor detects that a person is approaching the door of the refrigerator, a user feature is determined based on video frames of the user detected by the camera assembly, and then a window is established to display advertisements of products suitable of the user group.

Embodiment 3

Figure 6:
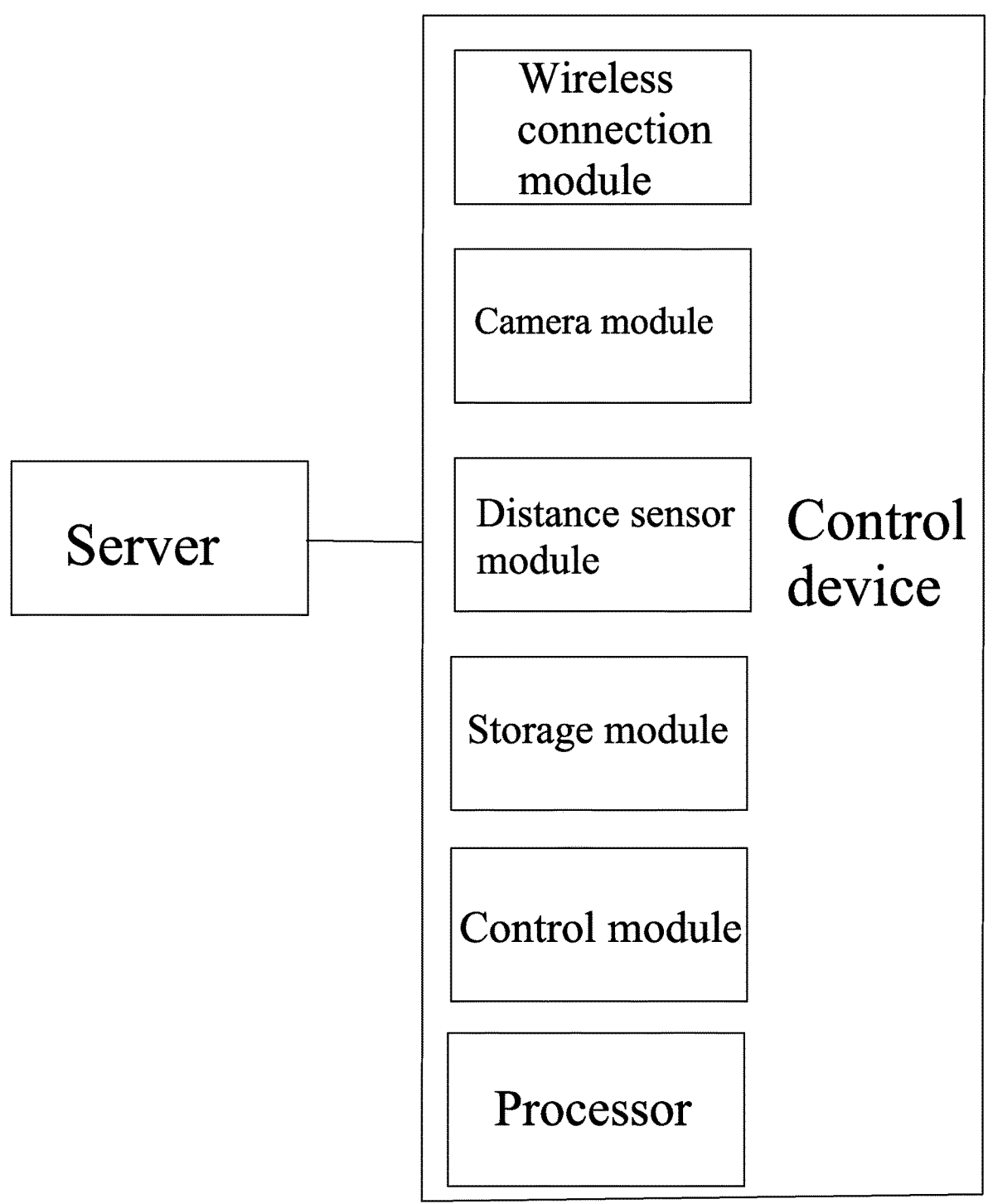
FIG. 6 is a principal diagram of a control device of the LCD screen of the refrigerator according to the invention.

A control device for a transparent LCD screen of a refrigerator, as shown in FIG. 6, comprises:

a processor;

a wireless connection module in communication connection with a server;

a camera assembly configured to acquire image information of a person approaching the door;

a distance sensor module configured to acquire motion information of the person approaching the door;

a storage module configured to store at least commodity content information and advertisement content information; and an external module connected to an external input device.

In use, the wireless connection module is connected to the server through Bluetooth, a wireless network or a wired network to obtain latest information, and the latest information is stored in the storage module; whether a person/face is approaching the door is detected by means of the camera assembly and the distance sensor module, and the control device controls a transparent LCD screen to display different content information according to signals from the camera assembly and the distance sensor module;

The external module is mainly used for facilitating circuit maintenance of the refrigerator and is connected to the input module such as a mouse or a keyboard, and the transparent LCD screen is used as a display.

Those skilled in the art can implement or use the invention with reference to the above description of the embodiments disclosed. Various modifications to these embodiments will be obvious to those skilled in the art, and the general principle defined herein can be implemented in other embodiments without deviating from the spirit or scope of the invention. Therefore, the invention should not be limited to these embodiments illustrated in the specification, and has the broadest scope consisting with the principle and novel features disclosed in the specification.

What is claimed is:

1. A refrigerator-easy to maintain and provided with a transparent LCD screen, comprising a main body and a door mounted on the main body, wherein the door comprises an inner door assembly, an outer door assembly, a transparent LCD screen module and a control assembly;

the inner door assembly comprises a first frame, and a first glass panel and a second glass panel which are mounted on the first frame, and a first gap is formed between the first glass panel and the second glass panel;

the outer door assembly comprises a second frame and a third glass panel mounted on the second frame;

the transparent LCD screen module and the control assembly are limited in a cavity formed between the inner door assembly and the outer door assembly;

the transparent LCD screen module and the control assembly are mounted on the second frame, the outer door assembly covers an outer surface and side edges of the door and is configured to be detachable from the door body, together with the transparent LCD screen module and the control assembly;

the transparent LCD screen module comprises an LCD screen and a light guide plate, the LCD screen is located on a front side of the light guide plate, the second glass panel is located on a back side of the light guide plate, and a second gap is formed between the light guide plate and the second glass panel;

a silicone sealing assembly is arranged between the transparent LCD screen module and the second glass panel and pressed between the first frame and the second frame to seal the second gap.

2. The refrigerator provided with a transparent LCD screen according to claim 1, wherein a first groove is formed in an inner side of the first frame, and the first glass panel and the second glass panel are inlaid and mounted in the first groove; the transparent LCD screen module is mounted on the second frame; a position for mounting the transparent LCD screen module is defined on a back side of the second frame by means of a bracket, and the silicone sealing assembly is pressed against the first frame by means of the bracket.

3. The refrigerator-easy to maintain and provided with a transparent LCD screen according to claim 2, wherein the first frame is rectangular, a first mounting region is formed in a middle of the first frame, the first glass panel and the second glass panel are mounted in the first mounting region, and an area of the first glass panel and an area of the second glass panel are greater than an area of the transparent LCD screen module;

the silicone sealing assembly comprises a sealing strip and a sealing strip holder, a second groove is formed in an inner side of the sealing strip holder, and the sealing stirp is inlaid and mounted in the second groove and extends towards a center of the second frame.

4. The refrigerator provided with a transparent LCD screen according to claim 2, wherein the second frame has a second mounting region, the third glass panel is mounted in the second mounting region, the second mounting region corresponds to the transparent LCD screen module, and contents displayed by the transparent LCD screen module are observed through the third glass panel.

5. The refrigerator provided with a transparent LCD screen according to claim 1, wherein the second frame and the first frame are connected through screws, and the third glass panel is fixedly mounted on the second frame.

6. The refrigerator provided with a transparent LCD screen according to claim 3, wherein the control assembly comprises a support plate, an LCD screen logic panel, a screen driver board, a power board and a mini pc; the LCD screen logic panel, the screen driver board, the power board and the mini pc are all mounted on the support plate; a protective cover with vent holes is arranged corresponding to the LCD screen logic panel, the screen driver board, the power board and the mini pc;

the second frame is provided with an opening, a surface cover is arranged corresponding to the opening, the control assembly is mounted in the cavity formed between the inner door assembly and the outer door assembly and exactly faces the opening, and the surface cover covers the control assembly;

the control assembly is provided with at least one type of wire port, and the wire port is uncovered after the surface cover is detached.

7. The refrigerator provided with a transparent LCD screen according to claim 6, wherein the control assembly is located below the transparent LCD screen module and corresponds to a surface of the second glass panel, the support plate is fixedly mounted on the second frame, and the surface cover is mounted on the second frame.

8. The refrigerator provided with a transparent LCD screen according to claim 7, further comprising a camera assembly and distance sensors, wherein the camera assembly, the transparent LCD screen module and the distance sensors are all electrically connected to the control assembly;

the camera assembly is mounted on the door, and the distance sensors are mounted on a front side of the door and symmetrically distributed left and right.

* * * * *